Oct. 10, 1939.   J. R. GUILDFORD   2,175,460
RELIEF VALVE
Filed April 7, 1936
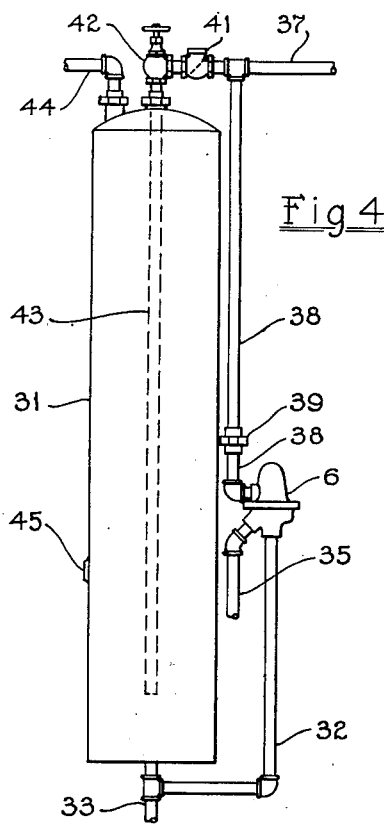
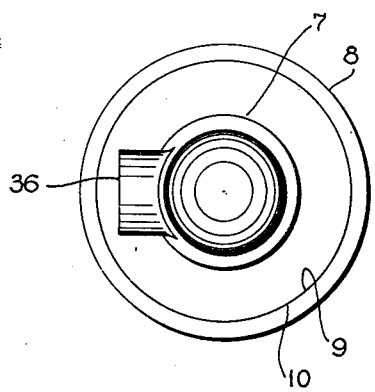
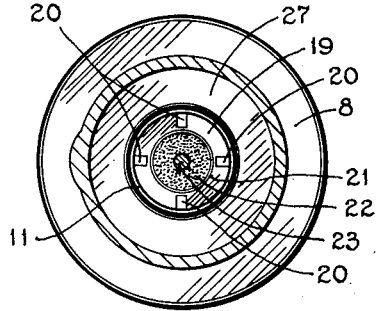
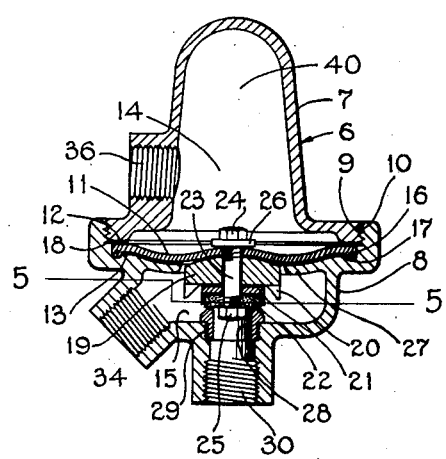
Joseph R. Guildford.
Inventor.

Patented Oct. 10, 1939

2,175,460

UNITED STATES PATENT OFFICE 2,175,460

RELIEF VALVE

Joseph R. Guildford, Regina, Saskatchewan, Canada

Application April 7, 1936, Serial No. 73,109

2 Claims. (Cl. 137—53)

My invention relates to improvements in a relief valve and has for its primary object to provide, in a manner as hereinafter set forth, a valve embodying a novel construction, combination and arrangement of parts through the medium of which, excess pressures may be relieved in pressure vessels, hot water storage tanks, piping and the like.

Other objects of the invention are to provide a relief valve which will be simple in construction, strong, durable, highly efficient, reliable in use, compact and fool-proof, and which may also be manufactured at low cost.

All of the foregoing and still further objects and advantages of the invention will become apparent from a study of the following specification, taken in connection with the accompanying drawing wherein like characters of reference designate corresponding parts throughout the several views, in which:

Figure 1 is a view in vertical section through the relief valve in accordance with the present invention.

Figure 2 is a view in top plan of the relief valve.

Figure 3 shows a section of the relief valve on line 5—5 looking upward.

Figure 4 is a vertical view showing the relief valve in an installed position in connection with a hot water storage tank.

Referring to the drawing:

The numeral 6 designates the relief valve comprising an upper section 7 and a lower section 8, which are detachably secured together by means of a male thread 9 and female thread 10.

The marginal portion of a flexible diaphragm 11 is clamped between the flange 12 of upper section 7 and the flange 13 of lower section 8, so that the said diaphragm completely separates the relief valve 6 into upper and lower compartments 14 and 15, respectively.

The periphery of the flexible diaphragm 11 is reinforced with a circular metal ring 16 and clamped into an annular groove 17. A friction ring 18 is provided between the flange 12 of upper section 7 and the diaphragm 11 to prevent the diaphragm from twisting while said upper section 7 is being tightened into place. A weight 19 with guides 20, together with a disk holder 21 and a renewable disk 22 are detachably secured to the diaphragm 11 through the medium of a rod 23 threaded at both ends and nuts 24 and 25 which are threadedly mounted on the ends of the rod 23. A metal washer 26 slidably mounted on the upper end of the rod 23 is rigidly tightened into place on the diaphragm 11 by nuts 24 and 25. An annular flange 27 forming an integral part of the lower section 8 supports a peripheral portion of the diaphragm 11.

A tubular member 28 forming a removable seat adapted for the reception of the disk 22 is threadedly mounted in the lower section 8 at 29. A thread 30 is provided in the lower section 8 for attaching the relief valve 6 to a hot water storage tank 31 through pipe 32. The numeral 33 designates the point at which a return circulation pipe line from the hot water tank and a drain cock may be attached. A thread 34 is provided in the lower section 8 for attaching a pipe line 35 for conveying water to atmosphere when the relief valve is relieving excess pressure from the hot water tank.

A thread 36 is provided in the upper section 7 for attaching the relief valve 6 to the cold water supply pipe 37 through pipe 38 and union connection 39. The upper portion 40 of the upper compartment 14 is provided as an air chamber. Numeral 41 designates a check valve for preventing the backing up of water from the hot water storage tank into the water supply line 37 when excess pressure is being created. 42 designates a stop valve for shutting off the cold water supply to the hot water tank. 43 designates a drop tube for conveying the cold water supply to near the bottom of the hot water tank. 44 designates the hot water outlet from the hot water tank and 45 designates a threaded boss for attachment of a circulating flow line to the tank. The pipe 32 may be connected into the side of the hot water tank 31 if desired instead of to the bottom of the tank near 33, but this is optional. The relief valve may be attached at 30 to the top of the hot water storage tank 31, or to the hot water outlet 44 which is also optional.

The operation of the invention is as follows:

Water from the water main flows through the supply pipe 37, check valve 41 and stop valve 42 into the hot water storage tank 31 through the drop tube 43. Water is also conveyed from the water main into the upper compartment 14 of the relief valve 6 through pipe 37, 38 and union connection 39.

The weight 19 which is attached to the diaphragm 11, supplemented with the pressure of water in the supply main which is transmitted to the top of the diaphragm 11 in the upper compartment 14 of the relief valve causes the disk 22 to be held down tightly onto the tubular member 28.

Water from the tank 31 enters pipe 32. As the water in the hot water storage tank 31 becomes heated the pressure within the tank increases, and if no water is drawn out of the tank through the hot water outlet 44 this increase of pressure is transmitted to the check valve 41 which prevents water from the tank backing up into the cold water supply pipe 37. At the same time the increased pressure in the tank is transmitted through pipe 32 to the underside of the disk 22.

The pressure in pipe line 37 and 38, and in the upper compartment 14 of the relief valve 6 remains substantially constant, but since the area of the diaphragm 11 directly above the weight 19 is much greater than the area of the disk 22 within the area of the tubular member 28, a differential pressure is created, which is obvious.

When this differential pressure is overcome by the increased pressure within the hot water storage tank the disk 22 is forced upward off the tubular member 28 permitting water from the tank to flow into the lower compartment 15 of the relief valve 6, from where the water will pass through the pipe 35 to the atmosphere.

When the increased pressure within the tank has been relieved by the above process, the disk 22 lowers into place on the tubular member 28 preventing further loss of water.

It is also obvious that the weighted diaphragm and hydrostatic head of a column of fluid in a state of inertia above the diaphragm 11 will cause the relief valve to close when the excess pressure within the system is relieved.

For instance, when a water supply to a system is shut off the pressure is decreased within the system leaving the water in the system in a state of inertia. If a fire within the firebox of a boiler or heater is replenished with fuel the water within the system will be caused to expand and as a pressure is created due to such expansion the relief valve will operate to relieve such increased pressure and thereafter close due to the weight of the column of liquid above the diaphragm 11 plus the weight attached to the diaphragm.

The portion 40 of the upper compartment 14 containing air permits compression during the operation of the relief valve.

It will be obvious that when the increased pressure is relieved by the relief valve, the coolest water within the hot water tank will be wasted during its operation. It will also be seen that since the diaphragm completely separates the upper compartment 14 from the lower compartment 15 circulation of water cannot take place between pipe 38 and pipe 32 to which the relief valve is attached and the possibility of scale forming within the tubular member 28 is less likely to happen.

The drain pipe 35 from the thread 34 may be omitted if desired, which will permit a screwdriver or similar tool to be inserted in the lower compartment 15 for the purpose of prying the disk 22 off the tubular member 28 for testing purposes, or washing foreign matter from between these two points.

It is believed that the many advantages of a relief valve in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

1. A valve for relieving excess pressures in pressure vessels comprising a casing providing an upper compartment having an aperture for the reception of fluid and a lower compartment having an inlet and an outlet open to atmosphere, a flexible sheet separating said upper and lower compartments, reinforcement means provided at the periphery of said flexible sheet, annular means provided in said lower compartment for reception of said reinforcement means, said flexible sheet being attached at its periphery between said upper and lower compartments, annular supporting means provided in said lower compartment for a peripheral portion of said flexible sheet, a weight on said flexible sheet, guiding means provided on the weight for alignment of said weight within the inner periphery of said supporting means, said weight being attached to the flexible sheet near the vertical axis of the valve casing within the inner periphery of said supporting means, closure means mounted on said weight, a tubular member in said inlet, said closure means adapted to seal said tubular member, a portion of said upper compartment being adapted to trap air.

2. A valve for relieving excess pressure in hot water storage tanks comprising a casing provided with an upper and a lower compartment, said upper compartment having an opening for the reception of a fluid, said lower compartment having an inlet and an outlet, a tubular seat in said inlet, an imperforate flexible diaphragm clamped between said two compartments preventing communication therebetween and having a weight mounted thereon, said weight having a compressible valve disk and guides thereon, the upper portion of said lower compartment having an opening therein for co-operation with said guides to guide said weight, and said disk co-operating with said seat to control the flow of a fluid through said inlet.

JOSEPH R. GUILDFORD.